 US008903985B2

United States Patent
O'Connell et al.

(10) Patent No.: US 8,903,985 B2
(45) Date of Patent: Dec. 2, 2014

(54) SHARING STATUS INFORMATION ACROSS A PLURALITY OF COMMUNICATION NETWORKS

(75) Inventors: John O'Connell, Uriage-les-Bains (FR); Marc Brandt, Eybens (FR); Alain Guigui, Bresson (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 65 days.

(21) Appl. No.: 12/578,019

(22) Filed: Oct. 13, 2009

(65) Prior Publication Data
US 2010/0100621 A1    Apr. 22, 2010

(30) Foreign Application Priority Data

Oct. 16, 2008  (EP) ................................. 08300278
Jan. 9, 2009   (EP) ................................. 09150283

(51) Int. Cl.
| | | |
|---|---|---|
| G06F 15/173 | (2006.01) | |
| H04L 12/24  | (2006.01) | |
| H04L 29/08  | (2006.01) | |
| H04L 12/26  | (2006.01) | |
| H04L 29/06  | (2006.01) | |
| H04W 8/20   | (2009.01) | |
| H04L 12/58  | (2006.01) | |
| H04W 48/08  | (2009.01) | |
| H04W 48/16  | (2009.01) | |

(52) U.S. Cl.
CPC ........... *H04L 41/5012* (2013.01); *H04L 63/104* (2013.01); *H04W 8/20* (2013.01); *H04L 67/141* (2013.01); *H04L 43/0817* (2013.01); *H04L 41/5064* (2013.01); *H04L 67/142* (2013.01); *H04L 67/24* (2013.01); *H04L 51/04* (2013.01); *H04W 48/08* (2013.01); *H04L 67/14* (2013.01); *H04W 48/16* (2013.01); *H04L 67/16* (2013.01); *H04L 67/2823* (2013.01); *H04L 12/581* (2013.01)
USPC ....................................................... 709/224

(58) Field of Classification Search
USPC .............. 709/223, 224, 204, 206; 3/223, 224, 3/204, 206
See application file for complete search history.

(56) References Cited

U.S. PATENT DOCUMENTS

| | | | |
|---|---|---|---|
| 6,687,505 B1    |         | 2/2004  | Hagebarth |
| 2003/0208588 A1 | *       | 11/2003 | Segal ............................ 709/224 |
| 2006/0101119 A1 | *       | 5/2006  | Qureshi et al. ................ 709/206 |
| 2006/0224671 A1 | *       | 10/2006 | Miyata et al. ................. 709/204 |
| 2007/0198725 A1 | *       | 8/2007  | Morris .......................... 709/227 |
| 2008/0320082 A1 | *       | 12/2008 | Kuhlke et al. ................. 709/205 |

OTHER PUBLICATIONS

Day, Rosenberg, Sugano. "A Model for Presence and Instant Messaging". Published Feb. 2000. RFC 2778.*
Flowerfire: "Sawmill—Universal log file analysis and reporting" [Online] Mar. 19, 2008, pp. 1-15, XP002561825 Retrieved from the Internet: URL: http://web.archive.org/web/20080319114746/http://www.sawmill.net/features.html [retrieved on Jan. 4, 2010].
Office Communication received in Corresponding EP Application No. 09 150 283.1 dated Jan. 18, 2013.

* cited by examiner

*Primary Examiner* — Scott Christensen

(57) ABSTRACT

A method and system for sharing status information across a plurality of communication networks is presented. Such a method and system is adapted to collect and make available network session status information and to collect and make available network user status information.

15 Claims, 3 Drawing Sheets

SHARING STATUS INFORMATION ACROSS A PLURALITY OF COMMUNICATION NETWORKS

The present application claims priority to European Patent Application No. 09150283.1, filed Jan. 9, 2009, and European Patent Application No. 08300278.2, filed Oct. 16, 2008, both of which are incorporated by reference in their entireties.

BACKGROUND

Many different types of communication networks are currently known, such as fixed telephony networks, mobile telephony networks, wired and wireless broadband networks, and Internet Protocol (IP) Television (TV) networks, for example. These networks typically employ their own methods for managing network sessions, for identifying users who create such network sessions, and for identifying users who access network services.

These is no generic way for an application to discover what sessions are currently in progress and which users are participating in those sessions. An application that needs to know the status of a given network session or of a given network user must use methods which are specific to the network. Furthermore, such network specific methodologies make it difficult to share information across network boundaries.

Thus, for complex applications which need to manage multiple network sessions spanning multiple networks, with multiple network users involved in each session, it is difficult to obtain accurate information in a uniform way regarding the status of such network sessions and the status of the network users involved in those sessions.

Existing approaches to address such problems require the application to have detailed knowledge of how sessions are managed within each network and require the application to interact with the appropriate session management element. An application is then required to deduce the information regarding session and user status from callbacks that are invoked by the session management element

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

According to an aspect of the invention there is provided a system for sharing status information across a plurality of communication networks, the system being adapted to collect and make available network session status information and to collect and make available network user status information.

By collecting information about ongoing network session and network users, embodiments enable the real-time correlation between user status and network session. Status information may therefore be made available to applications, where those applications may be running within the same network, hosted by a 3rd-party Application Service Provider (ASP), or running in a peer network domain.

Collected status information may be shared in a format common to a plurality of different communication networks. Exposing the status information in a uniform way, across multiple network domains, makes it easier for applications to manage network sessions in a coherent way and to re-act to changes in session or user status. The term expose means being made available for use by a network application. By way of example, status information may be displayed on a screen, stored on memory means, or transmitted in a response message. Storage of such status information will be understood to include temporary storage of status information, for example in program memory.

Examples of supported network sessions include voice calls, video calls, data session, audio/video conferencing, instant messaging, IPTV, etc. The list of session types is extensible. The network session model may support the concept of session hierarchies, where a network session may be comprised of multiple, simpler sessions, or sub-sessions. For example, a group collaboration session may be composed of an audio conference session, an instant messaging session and a content sharing session.

Figure 1:
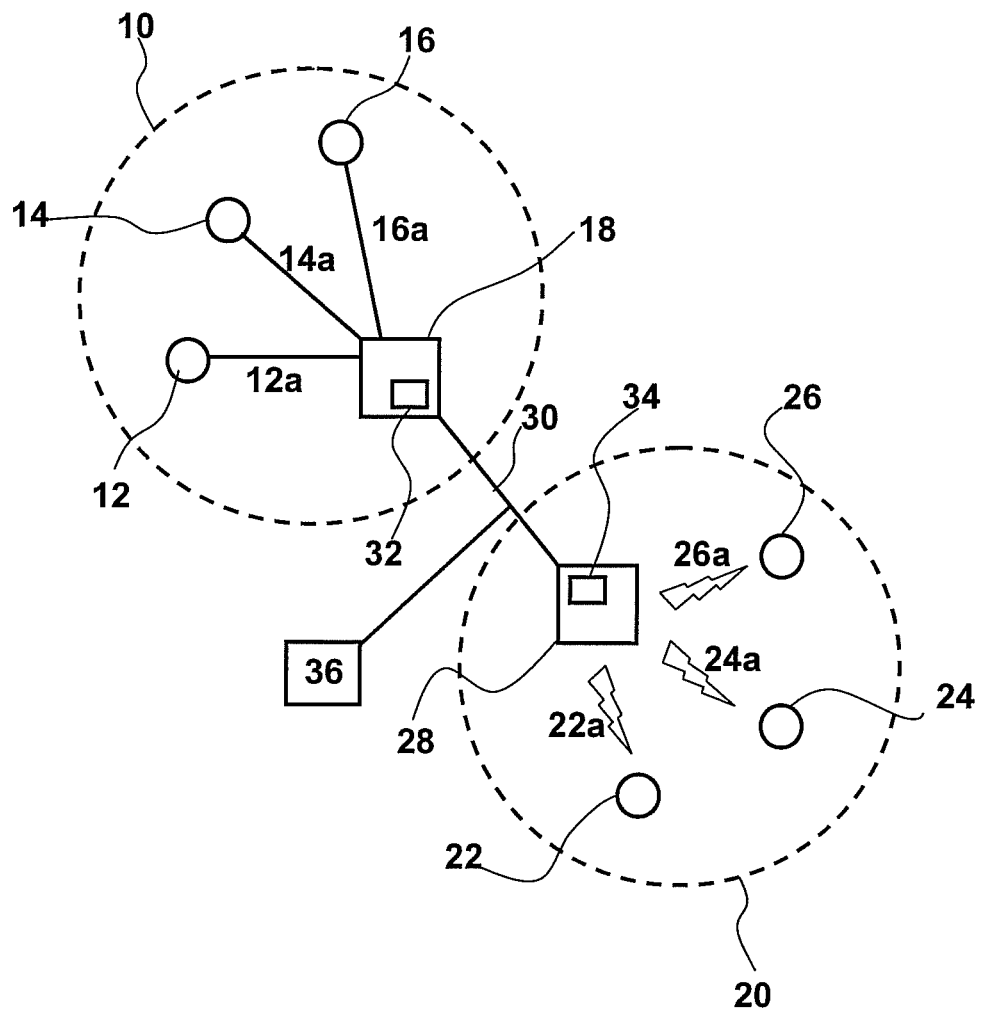
FIG. 1 illustrates a communication system comprising first and second communication networks according to an embodiment of the invention.

Referring to FIG. 1, an exemplary embodiment of a communication system comprising first 10 and second 20 communication networks will now be described.

The first communication network 10 comprises first 12 to third 16 network devices connected to a first network server 18 via first 12a to third 16a wired communication links, respectively. It will thus be appreciated that devices in the first communication network 10 can communicate information between each other via the first network server 18. The first 12 to third 16 network devices can each be operated by one or more network users. Further, by way of example, the first network server 18 is a voice telephony server.

The second communication network 20 comprises fourth 22 to sixth 26 network devices connected to a second network server 28 via first 22a to third 26a wireless communication links, respectively. Devices in the second communication network 20 can therefore communicate information between each other via the second network server 28. Similarly to the devices of the first communication network 10, the devices of the second communication network 20 can each be operated by one or more network users. Also, unlike the first network server 18, the second network server 28 is, by way of example, an instant messaging server.

The first and second communication networks are connected via a seventh communication link 30 which connects the first network server 18 to the second network server 28. Hence, a device of the first communication network 10 can be in communication with a device of the second communication network 20, via the connection 30 between the first 18 and second 28 network server, and data can be exchanged there between.

Also connected to the seventh communication link 30 is an application hosted on an Application Service Provider (ASP) 36, which is external to the first 10 and second 20 communication networks.

The first 18 and second 28 network servers comprise first 32 and second 34 systems for sharing status information, respectively. Each of the first 32 and second 34 systems for sharing status information are implemented as a Session and User Status Function (SUSF). Accordingly, the first 32 and second 34 systems for sharing status information will hereinafter be referred to as the first 32 and second 34 SUSFs, respectively.

The first SUSF 32 is implemented using a data storage medium on the first network server 18 and is adapted to store status information regarding the status of network sessions and network users of the first communication network 10. Similarly, the second SUSF 34 is implemented using a data storage medium on the second network server 28 and is adapted to store status information regarding the status of network sessions and network users of the second communication network 20. In other words, each SUSF maintains information regarding network sessions and network users of its respective network. Each SUSF is thus able to correlate network sessions with users in real-time.

Using the stored status information, the SUSFs 32 and 34 are adapted to handle queries regarding network sessions, such as questions on the nature and status of a network session and questions on which users are participating in a given session. The SUSFs 32 and 34 can also respond to queries on a given user's status, such as what network sessions are currently active, what devices are being used, and what devices are active, for example.

Each SUSF is adapted to issue a notification message when there is a change in a network session state or in a user's status. A notification message can be sent to an application that has previously registered a request to receive such information about session and/or user status changes.

Thus, not only can an application request the current status of a user from an SUSF, an application can also request to be informed if and/or when a status changes. In that case, the application will receive a notification message when there is a change.

The first SUSF 32 is adapted to share stored status information with network devices and network applications not only within the first communication network 10, but also with network devices, network applications and the second network server 28 of the second communication network 20. Likewise, the second SUSF 34 is arranged to share stored status information with devices and applications in both the first 10 and second 20 communication networks. Each SUSF therefore supports the sharing of session and user status information across communication network boundaries.

The shared session and user status information is made available in a format common to both of the communication networks. Thus, network applications, whether hosted by 3rd-party Application Service Providers (ASPs) or residing in a peer network, may issue query commands to a SUSF and request notifications of when the status of a session of user changes.

The network application hosted on the external ASP 36 therefore uses the SUSFs 32 and 34 to obtain information about ongoing network sessions and user status. Since the first network server 18 is a voice telephony server and the second network server 28 is an instant messaging server, there may not be any direct communication between the first 18 and second 28 network servers. However, if the external application 36 wants to combine the voice telephony server and the instant messaging server to create an integrated communication service, it may require the network session and user status information from both the first 18 and second 28 network servers. By implementing a SUSF in each of the network servers, such status information can be made available to the network application 36.

Access control mechanisms and/or policy enforcement mechanisms are implemented in the first 32 and second 34 SUSFs to restrict access to stored status information. For example, which applications can access the status information, and under what conditions, is controlled by each SUSF. In this way, status information that is of potentially sensitive nature can only be made available to applications, devices or users adhering to predetermined security requirements. Examples of security policies that could be supported include: only allowing access to user status information from applications to which a user has subscribed; only allowing access to user status information from in-network applications or applications residing in peer networks; and only allowing access to user status information during an active session.

Each SUSF is adapted to respond to queries coming from external applications and to apply appropriate access control and policy enforcement mechanisms. How the SUSF collects the information that is required to reply to these queries is an implementation decision, and may vary from network to network. By way of example, status information is provisioned directly into the first SUSF 32, such information being cached from information that resides elsewhere in the network. For the second SUSF 34, on the other hand, status information is obtained and retrieved from other devices or elements within the network on a per-request basis (i.e. status information required to respond to a request made to the second SUSF 34 is dynamically obtained when the request is received).

For each ongoing network session, the first 32 and second 34 SUSFs provide the session status, the nature of the session, session history information and a list of session participants.

Session status information comprises indications of whether the network session is being established, is established or has (recently) terminated.

Session history information includes information regarding who initiated the session, when the session was created, and some indication of how much data has been transmitted during the session.

The list of participants includes both end users and any network services that act as end points in the session. For example, in the case of a voice-mail call, the voice-mail system would be a participant in the voice session.

For network users, the first 32 and second 34 SUSFs are able to provide the user's status, a list of active (and inactive) devices, a list of active sessions, and other identifiers that are associated with the user. A network user is identified by a network identifier, which may be a fixed phone number, mobile phone number, email address, or IP-TV identifier, for example. Depending on the type of network user (phone user, broadband user, IP-TV user, etc), the user status information indicates whether or not the user is connected (to the network) and whether or not the user is busy. To account for the fact that each user can be associated with one or more network devices, the first 32 and second 34 SUSFs can also indicate what those devices are, and which of the devices are active or not.

The list of a network user's active network sessions, and the information that is provided on each active session, will depend on the type of user. For example, a mobile phone number may have an active voice call, video (3G) call, data session or SMS chat session, whereas an IP-TV user may have a TV session, Video-on-Demand session, or an interactive TV session.

The first 32 and second 34 SUSFs are adapted to explicitly associate other identifiers with a user identifier. For example, a mobile phone user could also be associated with an email address and a fixed phone number.

Historical status information, such as a list of recent sessions, can also be maintained by the each of the SUSFs.

By sharing the status information in a standard format (for example, a format that is common to multiple communication networks), the status information can be used across communication network boundaries. For example, a user of the first network device 12 in the first communication network 10 may connect to a multi-media collaboration service that is hosted by second network server 28. During the network session, that service may need to know what is the current status of the user of the first network device 12, and which of his/her other devices are also active at that time. If the multimedia collaboration service wants to multicast an MMS message to all of the participants, it may only be possible if all of the participants have a mobile device capable of receiving an MMS message and if such mobile devices are currently connected to the network.

Figure 2:
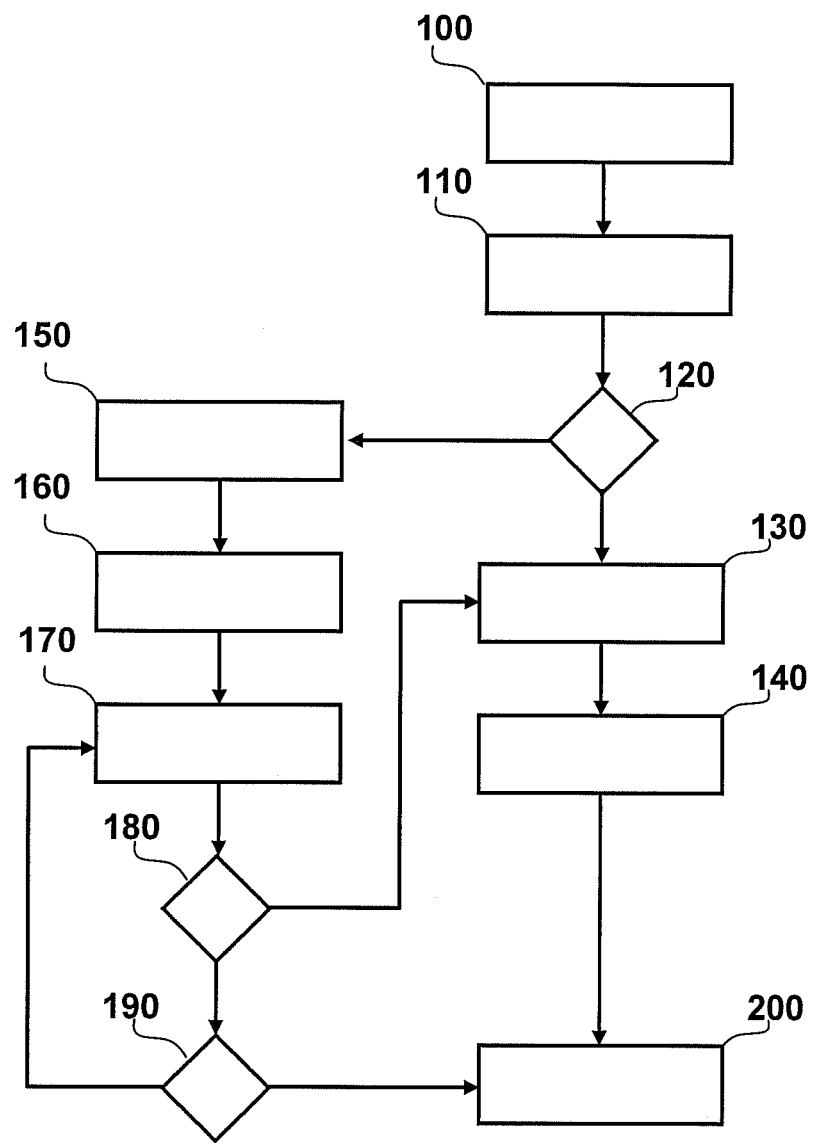
FIG. 2 is a flow diagram of a method according to an embodiment.

Referring to FIG. 2, according to an embodiment, the multi-media collaboration service can query the first SUSF 32 in the first communication network 10 (i.e. in the user's home network) to obtain such information. If a participant's mobile device is not currently active, the service could set a notification, for the duration of the session, asking to be notified if the status of that device changes.

Firstly, in step 100, the collaboration service transmits a query to the SUSF, requesting status information of a user and his/her mobile device(s), and the query is received by the SUSF.

Next, the SUSF retrieves status information about the user from the status information is has stored in its memory (step 110). If, in step 120, the SUSF determines from the stored status information that the user and associated mobile device (s) is/are active, the method proceeds to step 130 in which a response (for example, a "user available" response) is transmitted by the SUSF to the collaboration service confirming that the user is available to make use of the service. The "user available" response may contain information about the user and his/her device(s) which enables the service to establish a network session including the user (step 140).

If, on the other hand, the SUSF determines in step 120 that the user is not currently active and/or available to make use of the collaboration service, the method proceeds to step 150 in which a response (for example, a "user unavailable" response) is transmitted by the SUSF to the collaboration service informing the service that the status of the user is such that the service cannot establish a network session with the user.

In response to receiving such a user "unavailable" response, the collaboration service sends a notification request to the SUSF in step 160. Upon receiving the notification request, the SUSF proceeds to monitor the status information of the user and the network session in steps 170, 180 and 190.

If, in step 180, the SUSF determines from the status information that the user and associated mobile device(s) has changed to being active, the method proceeds to step 130 in which a response (for example, a "user available" response) is transmitted by the SUSF to the collaboration service confirming that the user is available to make use of the service, and a network session including the user is then established in step 140.

If, on the other hand, the SUSF determines in step 180 that the user is not currently active and/or available to make use of the collaboration service, the method proceeds to step 190 in which it is determined whether the network session is still available (for example, still active or available for the user to join). If the network session is determined to still be available in step 190, the method returns to step 170 and the monitoring process repeats. Conversely, if in step 190 the network session is determined to no longer be available, the monitoring process is no longer required and the method ends by proceeding to step 200.

The method also proceeds from step 140 to step 200 when the network session is terminated.

In this example, access to the user status information can be granted implicitly (or, unless otherwise restricted) for the duration of the call—that is, access is automatically granted when the user connects to the service (subject to respecting other security restrictions and/or policies) and is automatically revoked when the user disconnects from the service.

In some cases, the user may not wish for information regarding his/her devices or his/her other identifiers to be shared with other network applications. In this case, the first SUSF 32 can also act as a proxy for the user. For example, the first SUSF 32 can inform external applications that the user does or does not have a mobile device, and it may indicate the status of that device, but without disclosing the mobile phone number. If the application subsequently wishes to establish a voice call or send an SMS to the mobile device, the first SUSF 32 can act as a proxy to set up the call or to deliver the SMS.

Figure 3:
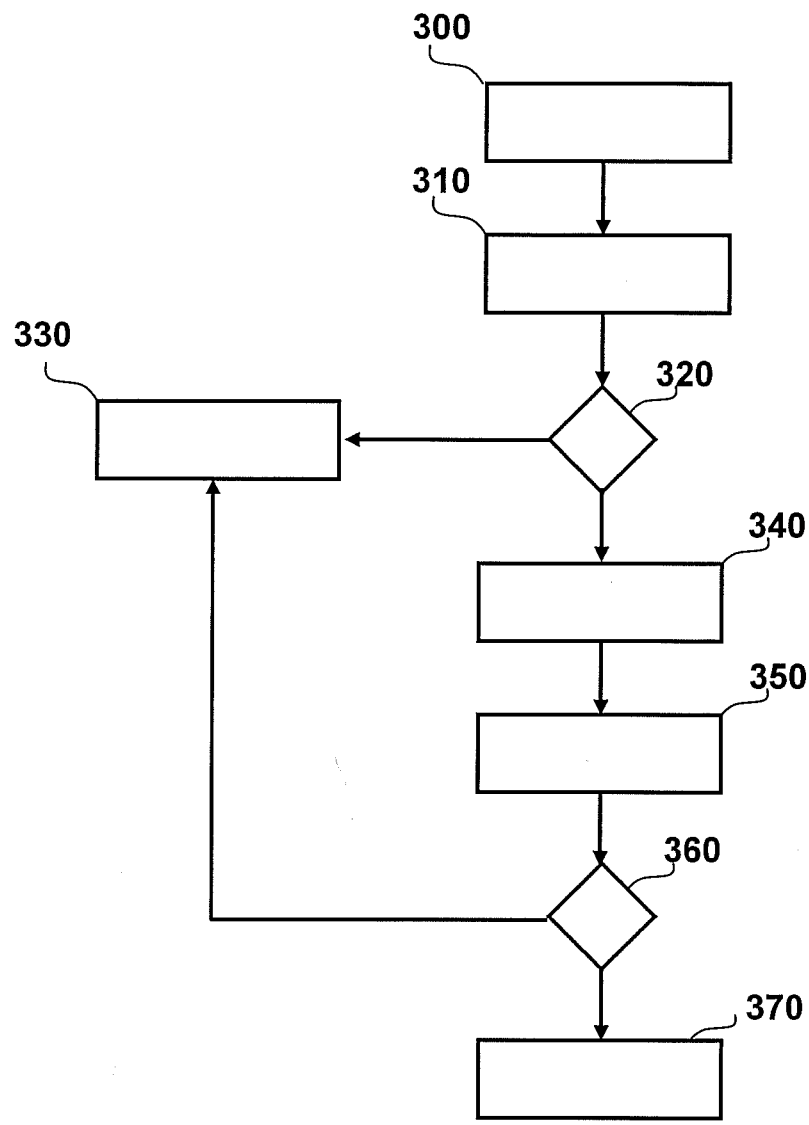
FIG. 3 is a flow diagram of a method according to another embodiment.

Referring now to FIG. 3, an exemplary method according to an embodiment will now be explained.

Firstly, in step 300, a network application service transmits a query to the SUSF, requesting the status information of a user and his/her mobile device(s) in order to a establish a network session with the user, and the query is received by the SUSF.

Next, the SUSF determines whether or not the network application should be granted access to the requested status information in step 310, for example by undertaking security procedures and checks. If, in step 320, the SUSF determines that the network application is not authorized to access the status information, the method proceeds to step 330 in which a response (for example, an "access denied" response) is transmitted by the SUSF to the network application informing it that is not authorized to establish a network session with the user. The "access denied" response may contain information about the reason(s) as to why access has not been granted.

If, on the other hand, the SUSF determines in step 320 that the network application is authorized to access the status information in order to establish a network session, the method proceeds to step 340 in which a response (for example, an "access granted" response) is transmitted by the SUSF to the network application informing it is authorized to establish a network session with the user.

From step 340, the method proceeds to step 350 in which the SUSF retrieves information about the status of the uses from other devices or elements within the network, and subsequently proceeds further to step 360.

If, in step 360, the SUSF determines from the retrieved status information that the user and associated mobile device (s) is/are active, the method continues to step 370 in which a response (for example, a "user available" response) is transmitted by the SUSF to the network application confirming that the user is available to establish a network session. The "user available" response may contain information about the user and his/her device(s) which enables the service to establish a network session including the user. However, such information may be limited so as to avoid disclosing information against the wishes of the user, for example, and it may not include information about the identification number of the mobile device(s), such as the telephone number associated with the device.

If the application subsequently wishes to establish a network session with the user, the SUSF then acts as a proxy to set up the network session in step 370.

If, on the other hand, the SUSF determines in step 360 that the user is not currently active and/or available to make use of the collaboration service, the method continues to 330 in which a response (for example, a "access denied" response) is transmitted by the SUSF to the network application informing it that is not able to establish a network session with the user. The "access denied" response may contain information regarding the reason(s) as to why access has not been granted, for example informing the network application that the user is unavailable.

It will be understood that the first 32 and 34 second SUSFs are arranged to perform to the following functions:

Share network session status information in a common (standard) format, independently of the type of session;

Share network user status information in a common (standard) format, independently of the type of user;

Perform access control and policy enforcement, when network applications submit a query or notification request;

Issue a notification in response to a determined change in session or user status; and Operate as a proxy for a user if the user does not wish to expose certain information to external applications.

The implementation of an SUSF will depend on the type of network in which it is being employed. In the case of a mobile network, the SUSF will collect status information on mobile users from the Home Location Register (HLR) and Mobile Switching Centers (MSC) of the mobile network. The SUSF will use the HLR to get information on the status of the mobile phone (e.g. connected or not connected to the network). As soon as the phone connects to the network, the HLR will inform the SUSF. In one embodiment of the SUSF, the SUSF can then register a trigger with the HLR, using the MAP protocol, to be informed whenever the mobile device initiates or terminates a voice call. In this way, the SUSF will be informed by the MSC (for example, using an Intelligent Network (IN) protocol) when a call is initiated or received. Once a call has been established, the SUSF can then also request the MSC, again using the IN protocol, to inform it when that call is terminated. Using these existing mechanisms of the HLR and MSC, the SUSF can maintain up-to-date information on the status of that mobile device.

In another embodiment, the SUSF can be adapted to collect status information on a per-request basis. That is, rather than maintaining up-to-date information on all mobile devices (which could be resource consuming and inefficient), the SUSF could choose to gather the information only when it is requested by an external application. In this case, the SUSF would ask the HLR for the current status of the mobile phone (for example, using the MAP protocol), and if the mobile phone is busy, the SUSF would then ask the MSC that is responsible for the mobile device for more information on the current session (using a non-standard interface to the MSC). The latter step would require an open interface to the MSC, where the SUSF could request information on the current session involving a given mobile phone.

In the case of a fixed telephony network, the SUSF would need to be aware of the numbering plan of the fixed network. That is, for each fixed phone number, the SUSF would need to know what local telephony switch is responsible for that number. This information is known to the operational systems of the network (although there is no standard, as such, for getting the information). With that information, the SUSF can then request device status (i.e. fixed phone status) from the local switch. If the SUSF wants to register to be notified when a new call is initiated or terminated by that fixed phone, existing IN protocols can be used. Here, the SUSF would appear like a Service Control Point (SCP) to the telephony switches in the network, and those switches would use IN protocols to inform the SUSF whenever a call is established or terminated by the fixed phone.

Some of the advantages provided by embodiments may be described as follows.

A link between user status information and session status information can be created. Applications can therefore query the system to discover what users are involved in a given network session, and in what network sessions a user is active, for example. This status information can be used in real-time by an application to decide how best to interact with a user.

Embodiments can be easily implemented in conventional communication networks. A common model for exposing status information enables federation of the information across network domains, such as between peer networks and between a network and 3rd-party applications.

By integrating user information with session information, a fine-grained policy enforcement system can be used, so that data is only accessible for the duration of a session or while the user is using a specific service.

Where a network user does not want to expose certain data or information, embodiments can act as a communication proxy, thereby enabling communication with the user or content delivery to the user, whilst preventing the exposure of private information.

While specific embodiments have been described herein for purposes of illustration, various other modifications will be apparent to a person skilled in the art and may be made without departing from the scope of the invention.

The invention claimed is:

1. A system for sharing status information for a plurality of different types of network sessions in a plurality of communication networks, the system comprising:
a server, including a memory, to
collect and make available network session status information, wherein the network session status information indicates whether a network session is being established, is established or terminated,
collect and make available network user status information, wherein the network user status information indicates whether or not a network user is connected to a communication network of the plurality of communication networks or whether or not the network user is busy,
establish a link between the network status information and the network user status information, and
share, with network applications that use the plurality of different types of network sessions to communication in the plurality of communication networks, the collected information and the link between the network status information and the network user status information in a standard format common to the plurality of different types of network sessions, wherein the server provides users of the network applications across the plurality of communication networks with the ability to communicate with each other based on the network session status information and the network user status information and the link between the network status information and the network user status information.

2. A system according to claim 1, wherein the server is to restrict access to the collected status information.

3. A system according claim 1, wherein the server is to store the collected status information and the link between the network status information and the network user status information, and to update the stored status information and the link and issue a notification message in response to a detected change in at least one of a network session status of the network session or a network user status of the network user.

4. A system according to claim 1, wherein the server is to issue a reply message comprising the link and information relating to the collected information in response to request from at least one of the network applications.

5. A system according to claim 4, wherein the reply message further comprises status information collected by the server.

6. A system according to claim 1, wherein the server is to function as a proxy to prevent exposure of private user information.

7. A system according to claim 6, wherein to function as the proxy, the server is to determine availability of the network user to receive a communication service, determine information for the network user to establish a network session, provide the information to a service provider without disclosing information identified by the network user as private that would otherwise be sent to the service provider to establish the network session, establish the network session between the service provider and the network user, wherein the communication service is to be provided via the network session.

8. A system according to claim 1, wherein the plurality of communication networks comprises at least one network device having one or more associated network users.

9. A system according to claim 1, wherein the network session status information includes an indication of who initiated a network session.

10. A system according to claim 1, wherein the plurality of communication networks include different types of communication networks using different communication protocols.

11. A system according to claim 1, wherein the server is to respond to a query according to the link and provide an indication of any network sessions for which the network user is currently active, based on the link, in the response to the query.

12. A method for sharing status information for a plurality of different types of network sessions in a plurality of communication networks, the method comprising:
    collecting network session status information and network user status information, wherein the network session status information indicates whether a network session is being established, is established or terminated, and the network user status information indicates whether or not a network user is connected to a communication network of the plurality of communication networks or whether or not the network user is busy;
    establishing a link between the network status information and the network user status information;
    sharing, with network applications that use the plurality of different types of network sessions to communicate in the plurality of communications networks, the collected information and the link between the network status information and the network user status information in a standard format common to the plurality of different types of network sessions; and
    providing users of the network applications across the plurality of communication networks with the ability to communicate with each other based on the network session status information and the network user status information and the link between the network status information and the network user status information.

13. A method according to claim 12, further comprising restricting access to collected status information based on an access control procedure.

14. A method according to claim 12 further comprising the steps of:
    storing the collected status information and the link between the network status information and the network user status information;
    updating the stored status information and the link; and
    issuing a notification message,
    wherein the steps of updating and issuing are based on a detected change in at least one of a network session status of the network session or a network user status of the network user.

15. A computer program embodied on a non-transitory computer data storage to perform, when run on a computer:
    collecting network session status information and network user status information, wherein the network session status information indicates whether a network session is being established, is established or terminated, and the network user status information indicates whether or not a network user is connected to a communication network of a plurality of communication networks or whether or not the network user is busy,
    establishing a link between the network status information and the network user status information,
    sharing, with network applications that use the plurality of different types of network sessions to communicate in the plurality of communications networks, the collected information and the link between the network status information and the network user status information in a standard format common to the plurality of different types of network sessions in the plurality of communication networks, and
    providing users of the network applications across the plurality of communication networks with the ability to communicate with each other based on the network session status information and the network user status information and the link between the network status information and the network user status information.

* * * * *

UNITED STATES PATENT AND TRADEMARK OFFICE
CERTIFICATE OF CORRECTION

| | |
|---|---|
| PATENT NO. | : 8,903,985 B2 |
| APPLICATION NO. | : 12/578019 |
| DATED | : December 2, 2014 |
| INVENTOR(S) | : John O'Connell et al. |

Page 1 of 1

It is certified that error appears in the above-identified patent and that said Letters Patent is hereby corrected as shown below:

In The Claims

In column 8, line 54, in Claim 3, delete "according claim" and insert -- according to claim --, therefor.

Signed and Sealed this
Twenty-first Day of July, 2015

Michelle K. Lee
*Director of the United States Patent and Trademark Office*